(12) United States Patent
Marrero O'Shanahan

(10) Patent No.: US 6,710,468 B1
(45) Date of Patent: Mar. 23, 2004

(54) FLOW ACCELERATING WIND TOWER

(76) Inventor: Pedro M. Marrero O'Shanahan, Dr. Apolinario Macias, 44, 35011 Las Palmas de Gran Canaria (ES)

( * ) Notice: Subject to any disclaimer, the term of this patent is extended or adjusted under 35 U.S.C. 154(b) by 0 days.

(21) Appl. No.: 10/130,101
(22) PCT Filed: Nov. 22, 2000
(86) PCT No.: PCT/ES00/00449
§ 371 (c)(1),
(2), (4) Date: Jul. 3, 2002
(87) PCT Pub. No.: WO01/38729
PCT Pub. Date: May 31, 2001

(30) Foreign Application Priority Data

Nov. 23, 1999 (ES) .......................... P 9902573

(51) Int. Cl.$^7$ ................................ F03D 9/00
(52) U.S. Cl. ........................... 290/55; 290/44
(58) Field of Search .................... 290/55, 44

(56) References Cited

U.S. PATENT DOCUMENTS

| | | | | | |
|---|---|---|---|---|---|
| 1,345,022 A | * | 6/1920 | Oliver | .......................... | 415/4.3 |
| 3,883,750 A | * | 5/1975 | Uzzell, Jr. | .................... | 290/55 |
| 4,021,135 A | * | 5/1977 | Pedersen et al. | ......... | 415/208.2 |
| 4,075,500 A | * | 2/1978 | Oman et al. | .................. | 290/55 |
| 4,079,264 A | * | 3/1978 | Cohen | .......................... | 290/55 |
| 4,087,196 A | * | 5/1978 | Kronmiller | .................. | 415/4.5 |
| 4,132,499 A | * | 1/1979 | Igra | .......................... | 415/210.1 |
| 4,140,433 A | * | 2/1979 | Eckel | ...................... | 415/209.1 |
| 4,275,989 A | * | 6/1981 | Gutierrez Atencio | ....... | 415/129 |
| 5,549,451 A | * | 8/1996 | Lyda, Jr. | .................. | 415/218.1 |
| 5,599,172 A | * | 2/1997 | McCabe | ..................... | 417/334 |

FOREIGN PATENT DOCUMENTS

| | | | | | | |
|---|---|---|---|---|---|---|
| FR | | 935673 A | * | 6/1948 | | |
| FR | | 1011132 A | * | 6/1952 | | |
| FR | | 1035426 A | * | 8/1953 | | |
| FR | | 2450362 A | * | 10/1980 | ............. | F03D/1/04 |
| FR | | 2474604 A | * | 7/1981 | ............. | F03D/1/04 |

* cited by examiner

Primary Examiner—Joseph Waks
(74) Attorney, Agent, or Firm—Ladas and Parry

(57) ABSTRACT

An eolian tower with a rotor of blades connected to devices for converting wind energy into energy of another type, which incorporates a wind-channeling conduit with a narrowing between the intake part and the outlet part which, in one of its possible embodiments, is situated in the central part of the conduit with the rotor arranged in its turn at the center of the narrowing. An eolian tower is also proposed with a rotor which sweeps an area in the shape of a circular crown and channeling conduits with narrowings appropriate to that shape or others that are similar. The eolian tower may also include a wind stimulator at the intake mouth of the conduit and means for closing the same.

20 Claims, 8 Drawing Sheets

PRIOR ART

PRIOR ART

FLOW ACCELERATING WIND TOWER

FIELD OF THE INVENTION

The present invention refers to aerogenerators for capturing wind energy and transforming it into electrical, mechanical or other type of energy.

BACKGROUND OF THE INVENTION

In the aerogenerators to which the present invention refers, there are three problematical areas which have been the object of different technical proposals.

In the first place optimalisation of the use of wind power has led to proposals for aerogenerators in which the rotor blades have appropriate shapes to approximate to the maximum potential levels of exploitation of wind energy described in Betz's theory, avoiding especially the limitative factors due to turbulence, and also to proposals for aerogenerators with variable rotor orientation which can be adjusted according to wind direction.

Secondly, different types of solutions are also known for confronting mechanical problems arising especially in aerogenerators with rotors having blades of great size and, in fact, today there are aerogenerators with rotor diameters of between 60 and 80 m, which operate satisfactorily.

Thirdly, the problems of converting wind energy into, especially, electrical energy have been the object of different technical proposals.

In spite of the fact that the known technology has achieved aerogenerators which, contrary to what was thought originally, have achieved acceptable levels of profitability in producing electrical energy, such aerogenerators, especially those of great size, involve very complex installations and require very high investment which limits their application.

The present invention is intended to resolve these drawbacks. While the different mentioned proposals have acted basically upon one of the determining factors of energy production, that is, the sweeping area of the rotor blades, resolving the problems arising from the use of greater rotor diameters to obtain greater power, the present invention proposes to act upon the other factor; wind sped, by accelerating its flow.

This in also the purpose of the devices described in FR 1 035 426 and FR 2 450 252. In particular FR 2 450 252 describes an eolian device having a rotating helix or turbine inside one wind-channeling conduit.

SUMMARY OF THE INVENTION

According to the first object of the invention, an eolian tower is provided with rotor blades which turn on a horizontal axis connected to devices for converting wind energy into another type of energy, which incorporates a wind-channeling conduit with a narrowing in its central part, where a rotor of the known type is situated which sweeps a circular area in the central part of the said narrowing. This structure causes an acceleration of wind flow which, with rotors of small diameter, allows result to be achieved which are similar to those obtained at the present time with rotors of much greater diameter. For its part, the incorporation of the conduit considerably simplifies the problem arising from the use of rotors of great diameter both in their mechanical aspect and in the aspects relating to the devices for converting into electrical or other types of energy.

The term "eolian tower" is used to denominate the object of the present invention in this description, instead of aerogenerator or other names used for any device for transforming wind energy into another type of energy, because, although they have similar purposes, the incorporation of the above-mentioned conduit confers upon it a very different outer appearance. Hovewer we will use the term aerogenerator in the claims to avoid any misunderstanding with the meaning of "eolian tower".

According to the second object of the invention, an eolian tower in provided which incorporates a wind-channeling conduit with a narrowing in the form of a circular crown in which a rotor is situated whose blades are configured in a shape appropriate to act on a sweeping area in the form of a circular crown.

According to the first and second object of the invention, the third object of the invention refers to the additional inclusion of closing means in the eolian towers for closing the intake mouth of the wind-channeling conduit and means for regulating the speed at which the wind enters in order to provide the rotors associated with the corresponding means of energy generation with a wind flow of optimal speed for transforming the wind energy into another type of energy.

Other features and advantages of the present invention will be inferred from the detailed description which follows of an illustrative, and in no sense restrictive, embodiment of its objects in relation to the attached drawings.

DETAILED DESCRIPTION OF THE INVENTION

Figure 1:
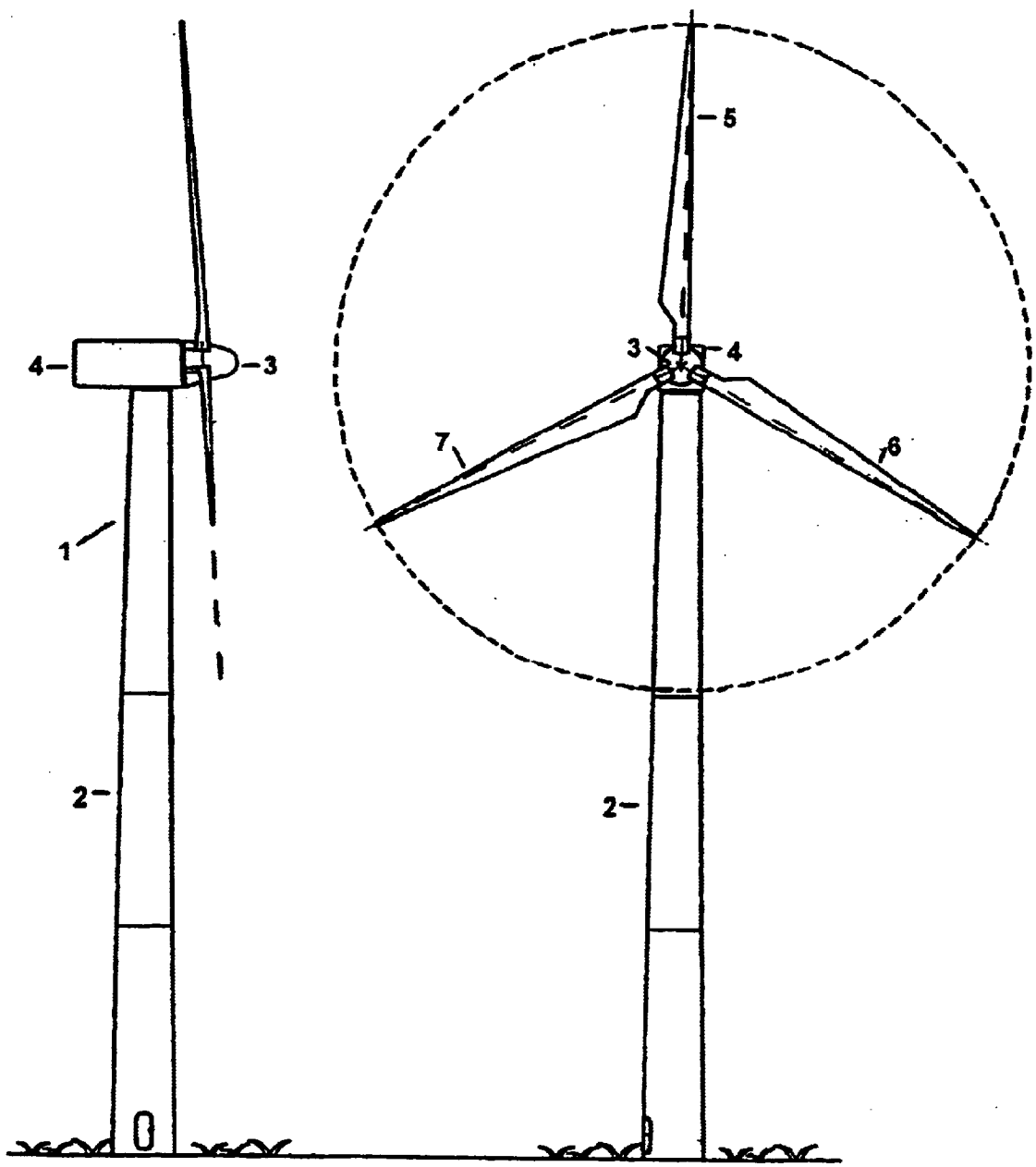
FIG. 1 shows side elevation views, on the left, and in front elevation on the right, of an aerogenerator that is know in the art.
Figure 2:
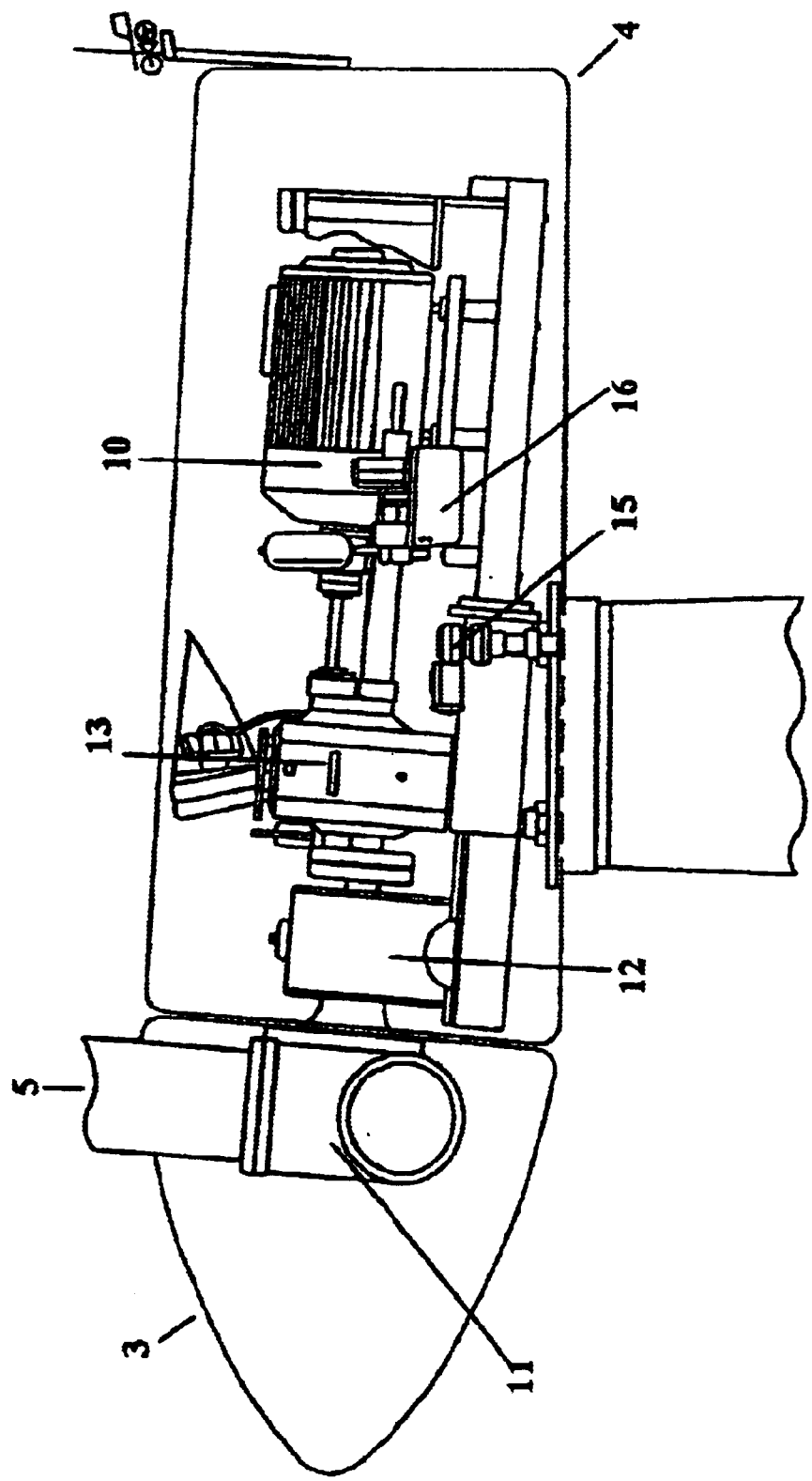
FIG. 2 shows in detail the elements that make up an aerogenerator know in the art.

In FIGS. 1 and 2 it may be observed that an aerogenerator (1), known in the state of the art for producing electrical energy, is made up of a supporting tower (2), a rotor (3) with three blades (5, 6, 7) and a housing (4) which contains the elements necessary for the generation of electrical energy, including a generator (10) coupled to the hub (11) of the rotor (3) by an of an axle (12) upon which a multiplier (13) in also situated for controlling the rotor's (3) orientation and movement, including reducing motor units (15) and a hydraulic unit (16) to supply the brake and the mechanism which regulates the blade sweep.

Figure 3:
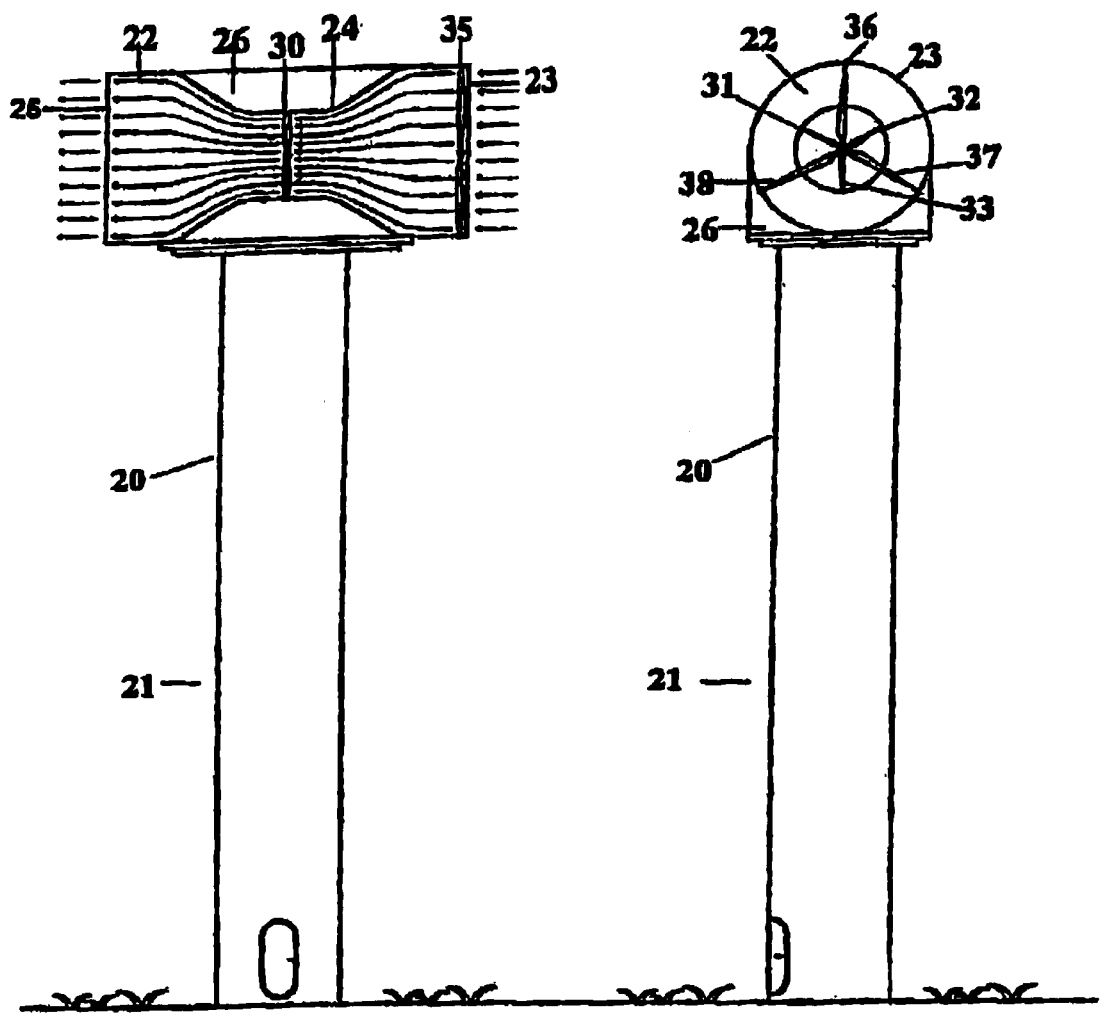
FIG. 3 shows views in vertical cross-section, on the left, and in front elevation, on the right, of an eolian tower according to the first and also the third object of the present invention.

We shall now describe the eolian tower (20) according to the first object of the invention with reference to FIG. 3 in which one may observe that it is made up of a supporting structure (21), a count (22) with an intake mouth (23), a central rowing (24) and an outlet mouth (25), a housing (26), a rotor (30) with blades (31, 32, 33) and, according to the third object of the invention, a wind stimulator (35) with blades (36, 37, 38).

The basic difference between the an aerogenerator (1) and the eolian tower (20) according to the invention lies in the incorporation of the conduit (22) with the central narrowing (24), intended to accelerate the wind flow, in the area in which the rotor (30) is situated. In order to reach similar power targets, the mentioned acceleration allows the diameter of the rotor (30) of the eolian tower (20) to be appreciably smaller than that of the rotor (3) of the aerogenerator (1), which favours an advantageous simplification of the building of the eolian tower (20).

In this sense, it should be observed that the supporting towers (2) of the known aerogenerators (1) must be tall to capture the wind of greater speed at higher levels and so that the ends of the blades (5, 6, 7) pass at a prudent distance from the ground, and they must also be slender to prevent the blades from colliding with them due to the strong sweepback of their end, since for aerodynamic reasons such blades function structurally as semigirders with a small edge and their length can, as we have said, reach 30–40 m. An can well be understood, these height and slenderness requirements entail significant building problems. For its part, the smaller size of the rotor (30) allows a greater angular rotation speed which could eliminate the need for the multipliers (13) used in known aerogenerators.

Figure 4:
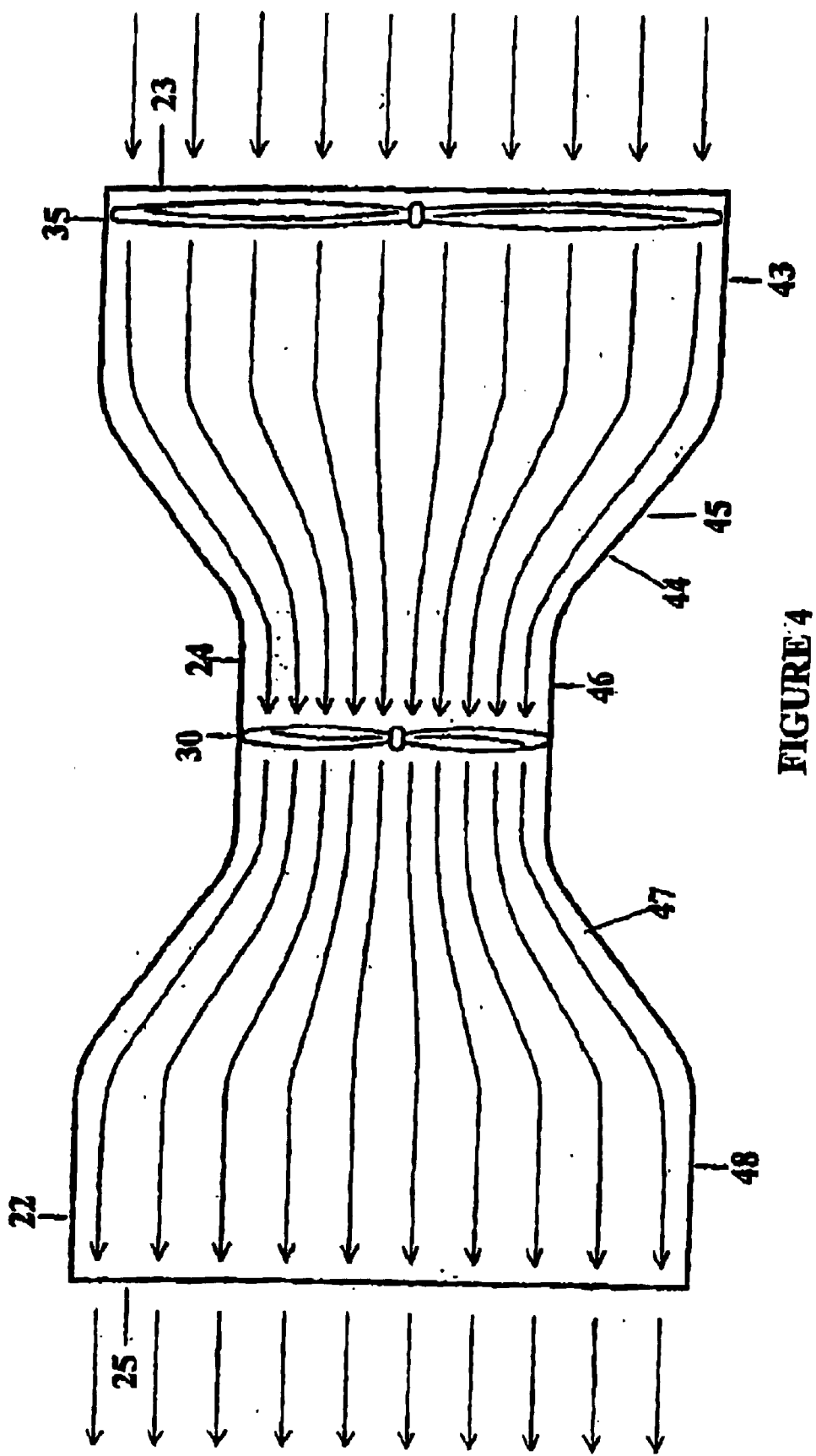
FIG. 4 is a view in longitudinal cross-section of the channeling conduit of the eolian tower according to the first and also the third object of the present invention.

As shown in greater detail in FIG. 4, the conduit (22) is shaped to cause a wind current, indicated by the narrowed lines, with a direction that is appreciably perpendicular to the sweeping plane of the rotor (30), accelerating its speed in relation to that of the intake in the conduit. There in a first area (43), with a constant circular cross-section to receive the wind, a second area (44) to accelerate the wind flow, with a first part (45) with a progressively increasing circular cross-section, a second part (46) with a constant cross-section at the end of which a rotor (30) in situated, and a third and fourth area (47, 48) to evacuate the wind, with a shape that is appreciably symmetrical to the said second and first area (44, 43), respectively.

In FIGS. 3 and 4 a conduit (2) is represented with a circular transverse cross-section in all its areas, but the invention also comprises conduits with transverse cross-sections of any shape suitable for channeling the wind currents in such a way that in the central narrowing (30) their direction in appreciably perpendicular to the rotor's (30) sweeping plane.

The housing (26) is to house similar means to those contained in the housing (4) of the aerogenerator (1) that is known in the art for the generation of energy and to control the orientation and movement of the conduit (22) and rotor (30) assembly.

The supporting structure (21) of the eolian tower (20) in represented in rectangular shape merely to indicate that it would not have the requirements of height and slenderness of the supporting towers (1) of the aerogenerators known in the art, as any convenient structure may be used.

It is estimated that an eolian tower (20) according to the invention of 350 Kw of power would require a conduit (22) with an intake mouth (23) of 8 meters diameter and a rotor (30) with a sweeping area of 6 meters diameter. A known aerogenerator (1) of 250 Kw of power requires a rotor with a sweeping area of 30 meters diameter.

Figure 5:
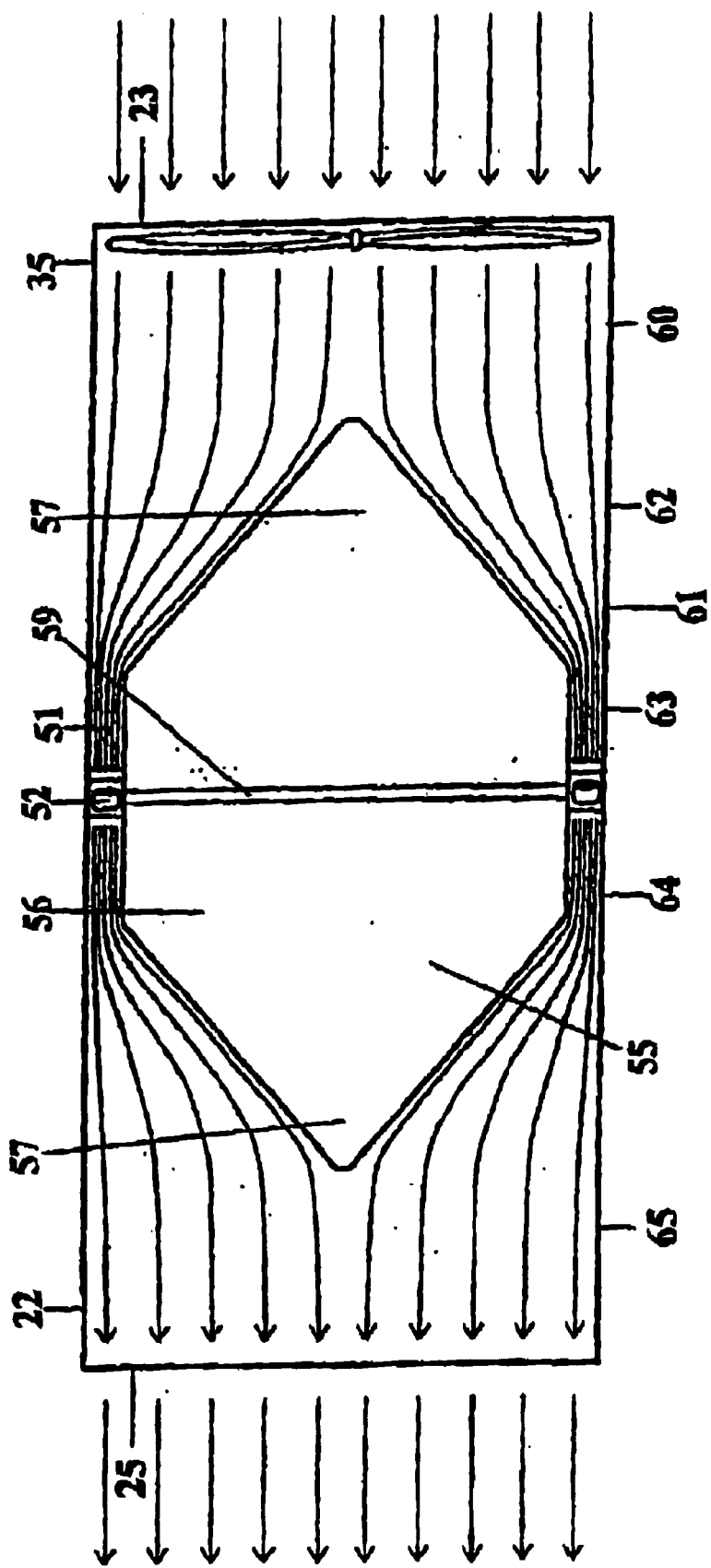
FIG. 5 is a view in longitudinal cross-section of the channeling conduit of the eolian tower according to the second and also the third object of the invention.

As a second object of the invention an eolian tower is proposed in which, with reference to FIG. 5, it may be observed that the conduit (22) has a narrowing (51) in the form of a circular and a rotor (52) with a sweeping area of the shape.

The said narrowing (51) is formed by the presence inside the conduit (22) of a body (55), made up of a cylindrical central part (56) and two outer, parts of a conical shape (57, 58), delimiting in the conduit a first area (60) with a constant circular cross-section to receive the wind, a second area (61) to accelerate the wind flow, with a first part (62) with a cross-section in the shape of a, circular crown with a progressively decreasing surface area, and a second part (63) with a constant cross-section in the shape of a circular crown, at the end of which a rotor (52) is situated; and a third and fourth area (64, 65) to evacuate the wind with a shape that is appreciably symmetrical to the said second and first areas (61 60) respectively.

Figure 6:
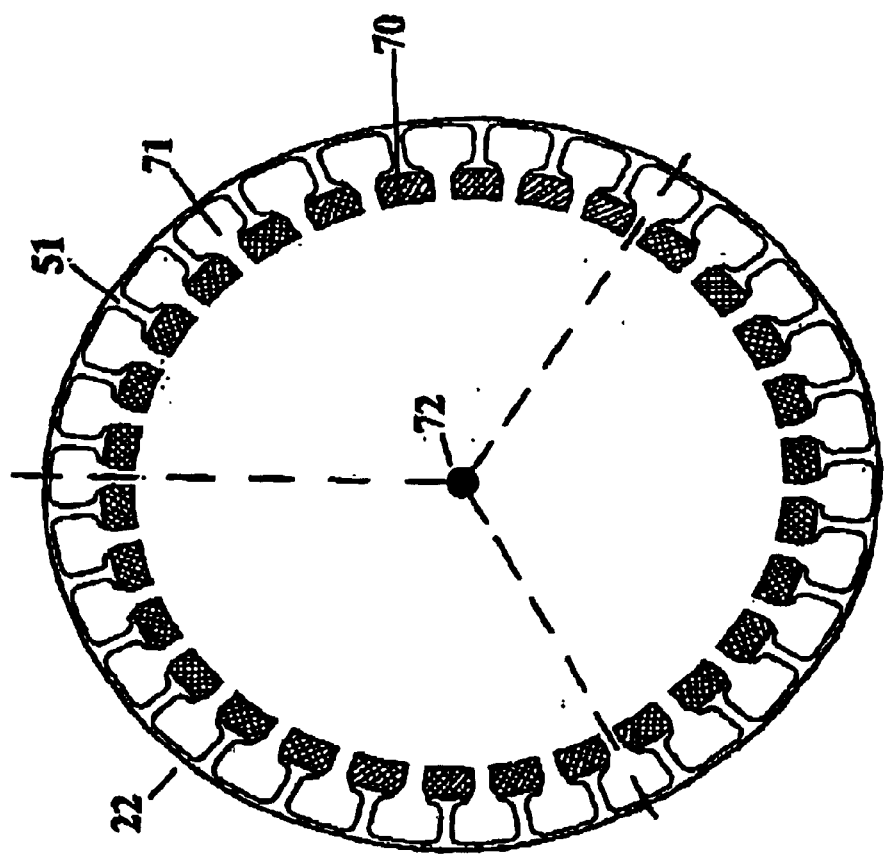
FIG. 6 is a front view of the rotor in the form of a circular crown used in the eolian tower according to the second object of the present invention.

FIG. 6 represents the rotor (52) in greater detail, in which it may be observed that it is made up of a support (70) with a plurality of blades (71) which are able to turn with respect to the axis (72) by means which are not represented, located in the central part (59) of the body (55). The rotor (52) operates in an analogous way to a conventional rotor (3), for a sweeping area in the shape of a circular crown.

The body (55), as well as providing a means to achieve the narrowing of the conduit (22), provides the space necessary to house similar means to those contained in the housing (4) of the aerogenerator (1) known in the art for the generation of energy and to control the orientation and movement of the conduit (22) and rotor (52) assembly.

Figure 7:
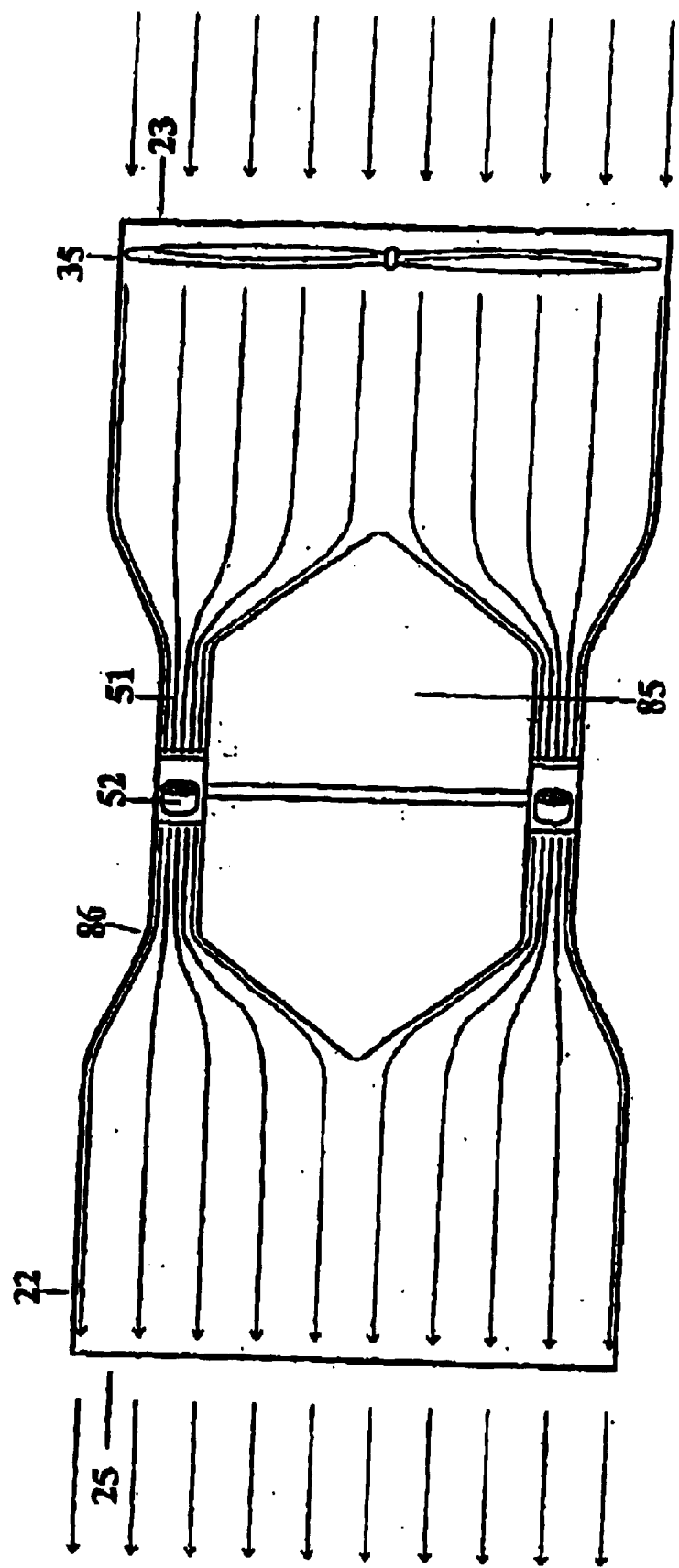
FIGS. 7 and 8 show views similar to those of FIGS. 5 and 6 of a variant embodiment of the eolian tower according to the second object of the present invention.
Figure 8:
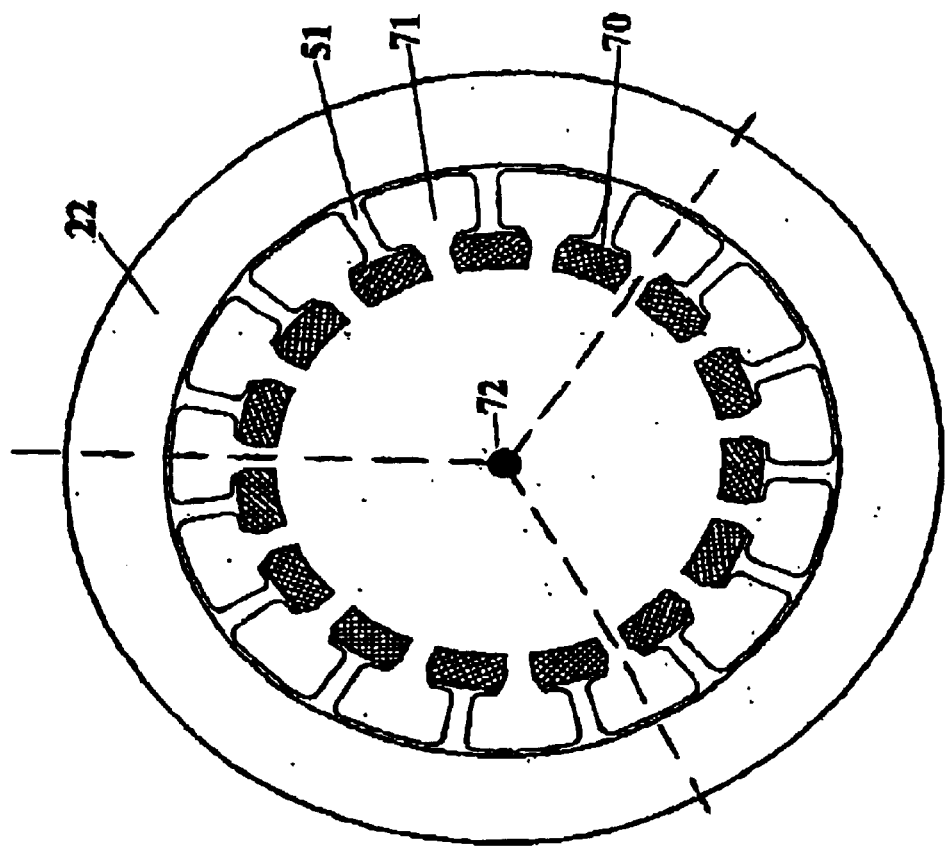

FIG. 7 shows a variant of the second object of the invention in which it may be observed that, together with the presence of a body (85) of a similar shape to the body (55) mentioned above, the conduit (22) has in its central part, an area with a smaller cross-section, delimiting the narrowing (51) of the conduit in the shape of a circular crown. For its part, FIG. 8 shows, analogously to FIG. 6, a front view of the rotor.

The third object of the invention refers to the additional inclusion in the eolian towers, according to the first and second object of the invention; of the wind stimulator (35) represented in FIGS. 3, 4, 5 and 7, made up of blades (36, 37 and 38) joined to a turning axle, with a similar shape to a conventional rotor, supported by convenient means to provide, in the first place, a means of regulating the speed of the air current which impels the rotors (30, 52) associated with the corresponding energy generation means. By varying the rotation speed and/or the angle of its blades, by similar means to those used in conventional rotors, the variability of wind intake speed into the eolian tower may be lessened, and the wind flow which reaches the rotors (30 or 52) will approach the optimal speed for the production of energy, without great variations in the weather.

In the second place, by giving the blades (36, 37 and 38) a shape by means of which their combined surface is equal to that of the circle which they sweep out, a means of closing the intake mouth is provided which is convenient when the wind speed is inappropriate for the operation of the eolian tower. Alternatively, the closing means may be made up of a hatch similar to those used in water pipes, in which case the function of the wind stimulator (35) would be limited to the said regulation of the speed of wind flow intake.

Although eolian towers with conduits and narrowings which are symmetrical with respect to a central plane have been described and represented as specific embodiments of the first two objects of the invention, a skilled person will understand that modifications may be introduced within the scope defined by the claims. With respect, in particular, to the second object of the invention, a skilled person will also understand that the narrowing may have the shape of a circular crown as well as other different shapes determined by conduits and inner bodies with a cross-section distinct from the circular. Finally, it must be pointed out that the wind stimulator to which the third object of the invention refers may have actuation means such that it can function in the absence of wind so that even in such circumstances the eolian tower continues to operate.

Other modifications could also be included, which are within the scope of the invention according to the following claims:

What is claimed is:

1. An aerogenerator with a rotor of blades which turn connected to devices for converting wind energy into energy of another type incorporating a wind-channeling conduit (22) having a wind intake zone and a wind outlet zone characterised in that:
   a) the wind intake zone is made up of a first area (43, 60) to receive the wind, with a constant cross-section; a second area (44, 61) to accelerate the wind flow, with a first part (45, 62) with a progressively decreasing cross-section, a second part (46, 63) with a constant cross-section, at the end of which the rotor (30, 52) is situated, said areas being shaped so that the accelerated wind flow will have a direction perpendicular to the sweeping plans of the rotor (30, 52);
   b) the wind outlet zone is made up of a a third area (47, 64) with a first part with a constant cross-section, a second part with progressively increasing cross-section and a fourth area (48, 65) with a constant cross-section, the shape of said third and fourth areas being appreciably symmetrical with respect to the sweeping plane of the rotor to the second and first areas of the wind intake zone, respectively.

2. An aerogenerator as claimed in claim 1, characterised in that all the wind-channeling conduit areas have a circular cross-section and the rotor (30) sweeps a circular area.

3. An aerogenerator as claimed in claim 2, characterised in that it comprises means for closing the intake mouth (23) of the conduit (22).

4. An aerogenerator as claimed in claim 2, characterised in that it also comprises a wind stimulator (35), situated at the intake mouth (23) of the conduit (22), made up of a plurality of blades (36, 37, 38) joined to a turning axle, of a such size that their sweeping area correspond to the area of said intake mouth (23).

5. An aerogenerator as claimed in claim 1, characterised in that the first and fourth areas (60, 65) have a circular cross-section, the second and third areas (61, 64) have a circular crown cross-section and the rotor (52) sweeps a circular crown shaped area.

6. An aerogenerator as claimed in claim 5, characterised in that the wind-channeling conduit (22) includes an inner body (55, 85) made up of a central cylindrical part (56) and two outer parts of conical shape (57).

7. An aerogenerator as claimed in claim 6, characterised in that the wind-channeling conduit (22) has a cylindrical shape.

8. An aerogenerator as claimed in claim 7, characterised in that the wind-channeling conduit (22) has a cylindrical shape with a central narrowing.

9. An aerogenerator as claimed in claim 8, characterised in that it comprises means for closing the intake mouth (23) of the conduit (22).

10. An aerogenerator as claimed in claim 6, characterised in that it comprises means for closing the intake mouth (23) of the conduit (22).

11. An aerogenerator as claimed in claim 6, characterised in that it also comprises a wind stimulator (35), situated at the intake mouth (23) of the conduit (22), made up of a plurality of blades (36, 37, 38) joined to a turning axle, of such a size that their sweeping area corresponds to the area of the said intake mouth (23).

12. An aerogenerator as claimed in claim 7, characterised in that it comprises means for closing the intake mouth (23) of the conduit (22).

13. An aerogenerator as claimed in claim 7, characterised in that it also comprises a wind stimulator (35), situated at the intake mouth (23) of the conduit (22), made up of a plurality of blades (36, 37, 38) joined to a turning axle, of such a size that their sweeping area corresponds to the area of the said intake mouth (23).

14. An aerogenerator as claimed in claim 8, characterised in that it also comprises a wind stimulator (35), situated at the intake mouth (23) of the conduit (22), made up of a plurality of blades (36, 37, 38) joined to a turning axle, of such a size that their sweeping area corresponds to the area of the said intake mouth (23).

15. An aerogenerator as claimed in claim 5, characterised in that it comprises means for closing the intake mouth (23) of the conduit (22).

16. An aerogenerator as claimed in claim 5, characterised in that it also comprises a wind stimulator (35), situated at the intake mouth (23) of the conduit (22), made up of plurality of blades (36, 37, 38) joined to a turning axle, of such a size that their sweeping area corresponds to the area of the said intake mouth (23).

17. An aerogenerator as claimed in claim 1, characterised in that it comprises means for closing the intake mouth (23) of the conduit (22).

18. An aerogenerator as claimed in claim 1, characterised in that it also comprises a wind stimulator (35), situated at the intake mouth (23) of the conduit (22), made up of a plurality of blades (36, 37, 38) joined to a turning axle, of such a size that their sweeping area corresponds to the area of the said intake mouth (23).

19. An aerogenerator as claimed in claim 18, characterised in that the combined surface area of the blades (36, 37, 39) is equal to that of the circle which they sweep.

20. An aerogenerator as claimed in claim 18, characterised in that the wind stimulator has actuation means distinct from the wind.

* * * * *